US012811230B2

(12) United States Patent
Kotak et al.

(10) Patent No.: US 12,811,230 B2
(45) Date of Patent: Nov. 24, 2026

(54) BATTERY CELL EXPANSION ACCOMMODATING ASSEMBLY AND METHOD FOR TRACTION BATTERY PACK

(71) Applicant: Ford Global Technologies, LLC, Dearborn, MI (US)

(72) Inventors: Nihar Kotak, Ashburn, VA (US); Francisco Fernandez Galindo, Canton, MI (US); Daniel Paul Roberts, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1098 days.

(21) Appl. No.: 17/842,162

(22) Filed: Jun. 16, 2022

(65) Prior Publication Data

US 2023/0411758 A1 Dec. 21, 2023

(51) Int. Cl.
*H01M 50/238* (2021.01)
*H01M 50/211* (2021.01)
*H01M 50/227* (2021.01)

(52) U.S. Cl.
CPC ....... *H01M 50/238* (2021.01); *H01M 50/211* (2021.01); *H01M 50/227* (2021.01); *H01M 2220/20* (2013.01)

(58) Field of Classification Search
CPC .. H01M 50/22; H01M 50/204; H01M 50/209; H01M 50/233; H01M 50/238; H01M 50/242; H01M 50/244; H01M 50/249; H01M 50/258; H01M 50/262; H01M 50/264; H01M 50/289; H01M 50/293
See application file for complete search history.

(56) References Cited

U.S. PATENT DOCUMENTS

| | | | | |
|---|---|---|---|---|
| 11,245,155 | B2 | 2/2022 | Jeon | |
| 2010/0098990 | A1 | 4/2010 | Suichi et al. | |
| 2011/0151309 | A1* | 6/2011 | Park .................... | H01M 10/052 429/151 |
| 2011/0262785 | A1* | 10/2011 | Johnson .............. | H01M 50/522 429/66 |
| 2012/0115004 | A1* | 5/2012 | Park .................... | H01M 50/209 429/120 |
| 2020/0203784 | A1* | 6/2020 | Shimizu ............ | H01M 10/6555 |
| 2022/0190416 | A1* | 6/2022 | Wu ...................... | H01M 50/242 |
| 2022/0255181 | A1* | 8/2022 | Takahashi ............. | H01M 10/44 |
| 2023/0307761 | A1* | 9/2023 | Yun ..................... | H01M 50/233 |

FOREIGN PATENT DOCUMENTS

| | | | |
|---|---|---|---|
| CN | 214013065 | U | 8/2021 |
| JP | 2007173030 | A | 7/2007 |
| JP | 2017152235 | A | 8/2017 |

* cited by examiner

*Primary Examiner* — Allison Bourke
*Assistant Examiner* — Travis L. Martin
(74) *Attorney, Agent, or Firm* — David B. Kelley; Carlson, Gaskey & Olds, P.C.

(57) ABSTRACT

A battery pack assembly includes battery cells, a first endplate adjacent a first end of the battery cells, a second endplate adjacent an opposite, second end of the battery cells, and a tension member. The first and second endplates are each slidably coupled to the tension member. A compressible member is disposed between the first endplate and a section of an enclosure. The compressible member is configured to compress in response to the battery cells expanding and moving the first endplate toward the section of the enclosure.

20 Claims, 3 Drawing Sheets

BATTERY CELL EXPANSION ACCOMMODATING ASSEMBLY AND METHOD FOR TRACTION BATTERY PACK

TECHNICAL FIELD

This disclosure relates generally to a battery pack of an electrified vehicle and, more particularly, to retaining battery cells in the battery pack while permitting the battery cells to expand.

BACKGROUND

A battery pack of an electrified vehicle can include groups of battery cells arranged in one or more battery arrays. Battery cells can expand as the battery pack is operated over time.

SUMMARY

In some aspects, the techniques described herein relate to a battery pack assembly, including: a plurality of battery cells; a first endplate adjacent a first end of the plurality of battery cells; a second endplate adjacent an opposite, second end of the plurality of battery cells; a tension member, the first and second endplates each slidably coupled to the tension member; and a compressible member disposed between the first endplate and a section of an enclosure, the compressible member configured to compress in response to the plurality of battery cells expanding and moving the first endplate toward the section of the enclosure.

In some aspects, the techniques described herein relate to an assembly, wherein the compressible member is a first compressible member and the section of the enclosure is a first section of the enclosure, and further including a second compressible member disposed between the second endplate and another section of the enclosure, the second compressible member configured to compress in response to the plurality of battery cells expanding and moving the second endplate toward the section of the enclosure.

In some aspects, the techniques described herein relate to an assembly, further including one or more pins on one of the first endplate or the tension member, each pin of the one or more pins received within an aperture in the other of the first endplate or the tension member to slidably the first endplate to the tension member.

In some aspects, the techniques described herein relate to an assembly, wherein the one or more pins includes two pins extending from a common side of the first endplate, each of the two pins received within a respective aperture in the tension member.

In some aspects, the techniques described herein relate to an assembly, wherein the tension member is a first tension member disposed along a first side of the plurality of battery cells, and further including a second tension member disposed along an opposite, second side of the plurality of battery cells, the first and second endplates each slidably coupled to the second tension member.

In some aspects, the techniques described herein relate to an assembly, wherein the first side of the plurality of battery cells faces vertically upward and the second side faces vertically downward.

In some aspects, the techniques described herein relate to an assembly, wherein the first and second tension members each include at least one aperture that receive an endplate pin to slidably couple the first and second endplates to the first and second tension members.

In some aspects, the techniques described herein relate to an assembly, wherein the first endplate, the second endplate, the first tension member, and the second tension member are configured to hold together the plurality of battery cells prior to installing the plurality of battery cells in a battery pack enclosure.

In some aspects, the techniques described herein relate to an assembly, wherein the section of the enclosure is a sidewall of a tray of the enclosure.

In some aspects, the techniques described herein relate to an assembly, wherein the compressible member is secured directly to the sidewall and directly contacts the first endplate.

In some aspects, the techniques described herein relate to an assembly, wherein the compressible member is foam.

In some aspects, the techniques described herein relate to an assembly, wherein the plurality of battery cells are pouch-style battery cells.

In some aspects, the techniques described herein relate to a battery cell retention method, including: holding a plurality of battery cells between a first endplate and a second endplate that are slidably coupled to the tension member; within a battery pack enclosure, sliding the first endplate relative to the tension member and the second endplate to accommodate expansion of the plurality of battery cells; and during the sliding, compressing a compressible member between the first endplate and the battery pack enclosure.

In some aspects, the techniques described herein relate to a battery cell retention method, wherein the compressible member is a first compressible member and further including, sliding the second endplate relative to the tension member and the first endplate to accommodate expansion of the plurality of battery cells, and, when sliding the second endplate, compressing a second compressible member between the second endplate and the battery pack enclosure.

In some aspects, the techniques described herein relate to a battery cell retention method, wherein the first and second endplates are slidably coupled to the tension member using a plurality of pins that are each received within a respective apertures.

In some aspects, the techniques described herein relate to a battery cell retention method, wherein the tension member is a first tension member on a first side of the plurality of battery cells, wherein the first and second endplates are slidably coupled to the first tension member and a second tension member on an opposite second side of the plurality of battery cells.

In some aspects, the techniques described herein relate to a battery cell retention method, wherein the compressible member is compressed, during the sliding, between the first endplate and a sidewall of the enclosure.

In some aspects, the techniques described herein relate to a battery cell retention method, wherein the compressible member is secured directly to the sidewall and directly contacts the first endplate.

In some aspects, the techniques described herein relate to a battery cell retention method, wherein the compressible member directly contacts the first endplate and the enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A traction battery pack includes an enclosure having an interior. Battery arrays can be held within the interior along with other components. The battery arrays each include a plurality of battery cells that are used to power an electric machine.

A volume of individual battery cells can change over time, especially when the battery cells utilize electrode materials like silicon oxide or high nickel lithium nickel cobalt manganese oxide (NCM). Structures holding the battery cells can exert forces on the battery cells. As the battery cells expand, maintaining these forces within a particular range can help to optimize an operational life of battery cells. That the volume of the battery cells can change over time can complicate maintaining forces within a particular range.

This disclosure details an exemplary systems and methods relating to retaining battery cells and other components of battery arrays prior to assembling the battery arrays into a battery pack, and after the battery arrays are assembled into the battery pack. The systems and methods hold the battery cells in a way that accommodates volumetric changes in the battery cells over time.

Figure 1:
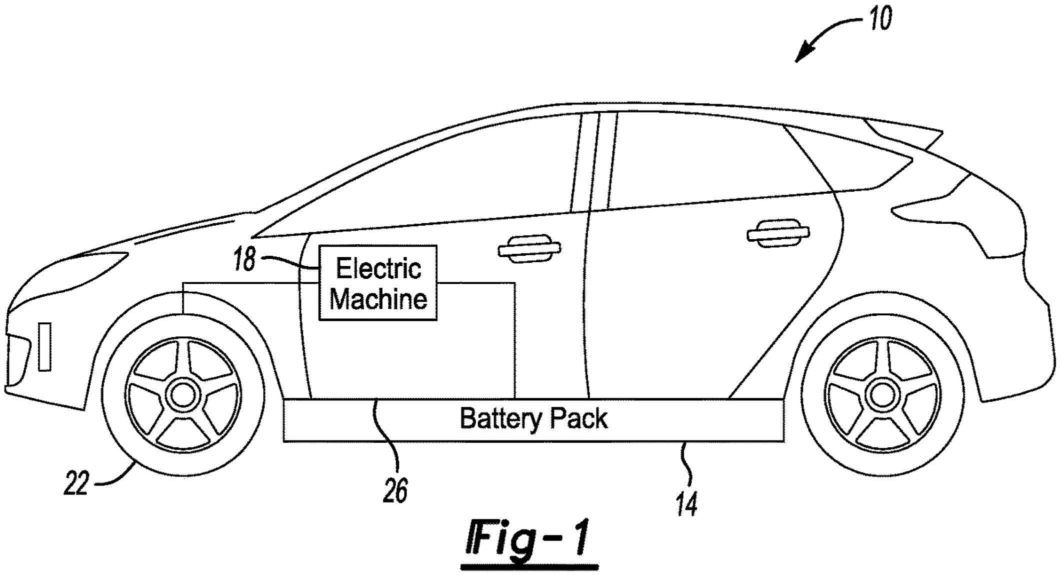
FIG. 1 illustrates a side view of an electrified vehicle having a battery pack.

With reference to FIG. 1, an electrified vehicle 10 includes a traction battery pack 14, an electric machine 18, and wheels 22. The battery pack 14 powers an electric machine 18, which can convert electrical power to torque to drive the wheels 22. The battery pack 14 can be a relatively high-voltage battery.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
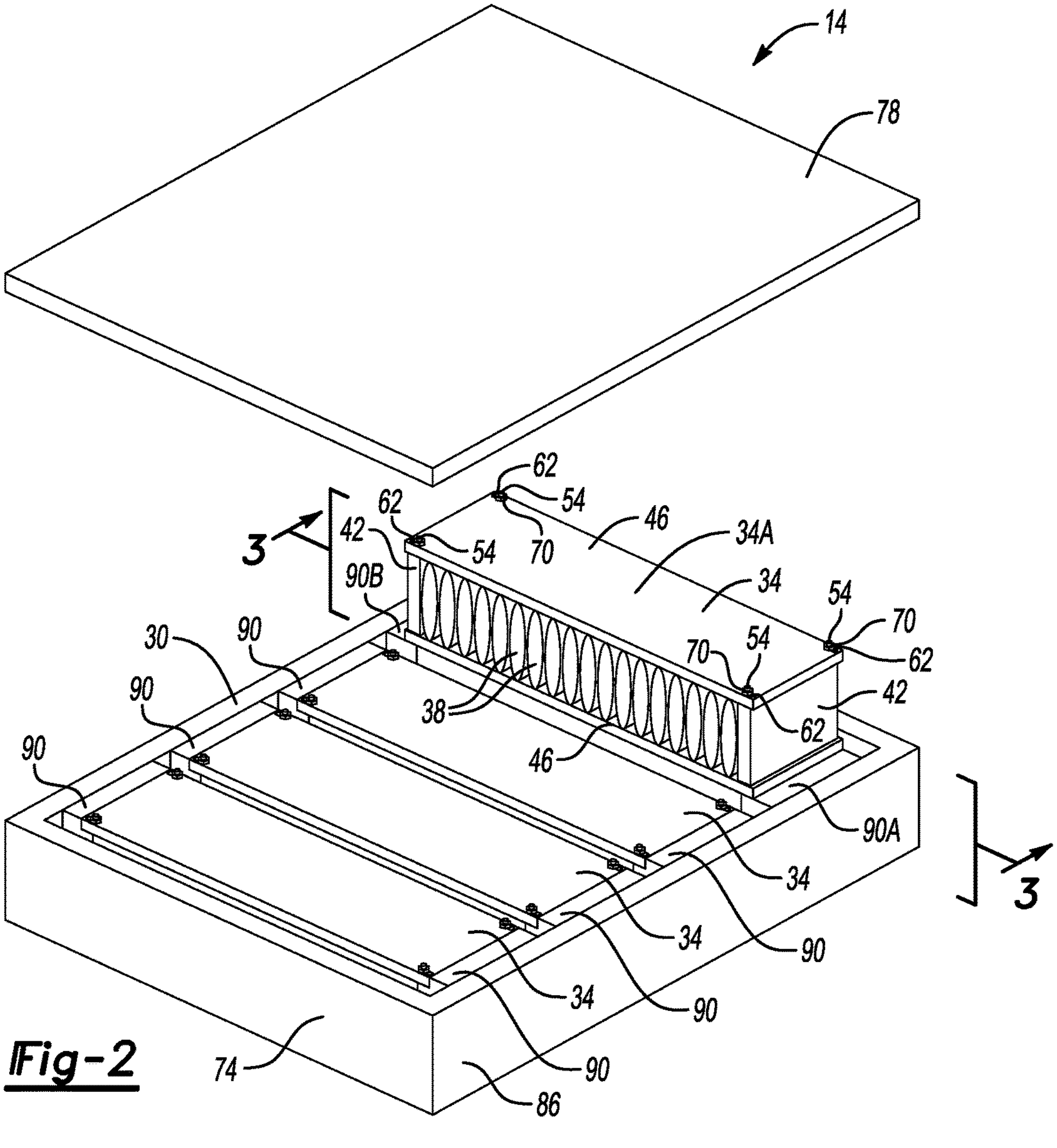
FIG. 2 illustrates a partially expanded view of the battery pack from FIG. 1 showing multiple battery arrays of the battery pack within an enclosure.
Figure 3:
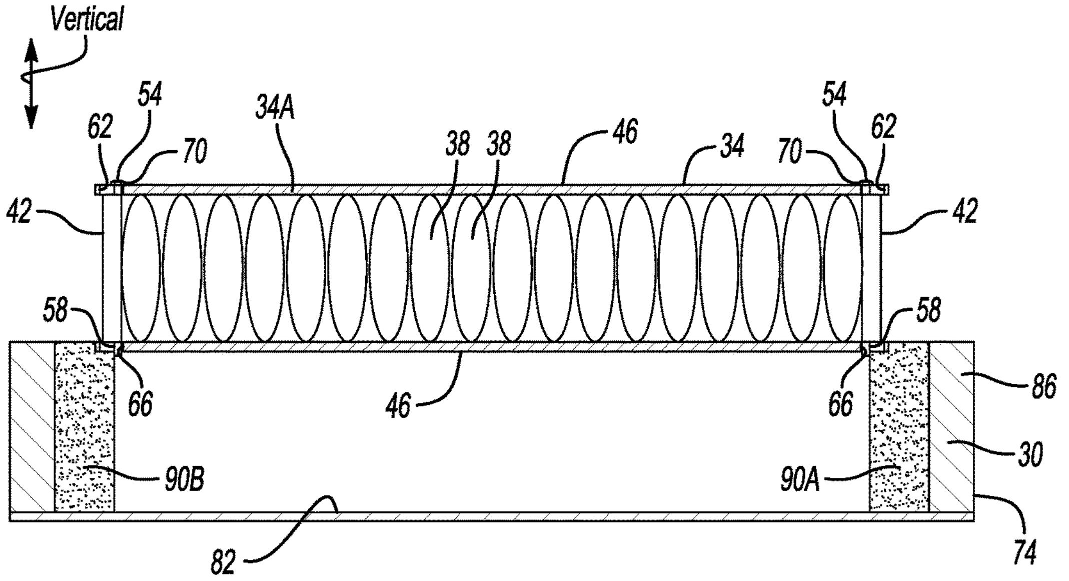
FIG. 3 illustrates a section view at line 3-3 in FIG. 2 showing a battery array of the battery pack moving toward an installed position within the enclosure.

Referring now to FIGS. 2 and 3 and with continuing reference to FIG. 1, the battery pack 14 includes an enclosure 30 that houses, among other things, a plurality of battery arrays 34.

In the exemplary embodiment, each of the battery arrays 34 includes a plurality of battery cells 38, endplates 42, and tension members 46. The battery cells 38 are retained by the endplates 42 and tension members 46.

One of the endplates 42 is adjacent a first end of the battery cells 38. The other endplate 42 is adjacent the second end of the battery cells 38. The battery cells 38 can be pouch-style cells. The battery cells 38 could be prismatic cells in another example. Within the battery arrays 34, the battery cells 38 are compressed between the endplates 42. For a given one of the battery arrays 34, changing a distance between the endplates 42 can change a compressive force exerted on the battery cells 38.

In this example, the battery arrays 34 each include two of the tension members 46. One of the tension members 46 is disposed over a first side of the battery cells 38. The other one of the tension members 46 is disposed over an opposite second side of the battery cells 38. The first side faces vertically upward in this example, and the second side faces vertically downward. Vertical, for purposes of this disclosure, are with reference to ground and a general orientation of the vehicle during operation.

The endplates 42 are slidably coupled with the tension members 46. In this example, the endplates 42 each include two pins 54 that extend upward from the same side of the endplates 42, and two pins 58 that extend downward from the same side of the endplates 42. The pins 54 are each received within an aperture 62 of the tension member 46 that is disposed over the first side of the battery cells 38. The pins 58 are each received within an aperture 66 of the tension member 46 that is disposed over the second side of the battery cells 38. The apertures 62 and 66 are elongated so that the pins 54 and 58 can slide relative to the tension members 46 while remaining coupled.

The battery arrays 34 can be shipped to a location for installation within the enclosure 30. In FIGS. 2 and 3, three of the battery arrays 34 are in the installed position, and the remaining battery array 34A is about to be transitioned to the installed position.

During shipping, the endplates 42 can be in the position of endplates 42 of the battery array 34A. This positioning can hold the battery cells 38 during shipping and until the battery array 34A is in the installed position.

The pins 54, the pins 58, or both can be threaded. Nuts 70, for example, can threadably engage at least some of the pins 54, 58 to hold the endplates 42 in a desired position during shipping and until the battery array 34 is positioned within the enclosure 30. The nuts 70 can be removed after, or just before, the battery array 34A is moved to the installed position within the enclosure 30

The enclosure 30 includes a tray 74 and a cover 78. The tray 74 includes a floor 82 and sidewalls 86 extending vertically upward from the floor 82.

When installed, the battery array 34A is positioned between a first compressible member 90A that is secured to a first section of the enclosure 30, and a second compressible member 90B that is secured to a second section of the enclosure 30. Other compressible members 90 are disposed on opposing sides of the remaining battery arrays 34 of the battery pack 14.

The first and second compressible members 90A, 90B can be fixed directly to the respective first and second sections by, for example, adhesively securing the first and second compressible members 90A, 90B to the first and second sections. The first second and the second sections are areas of opposing sidewalls 86 in this example.

Figure 4:
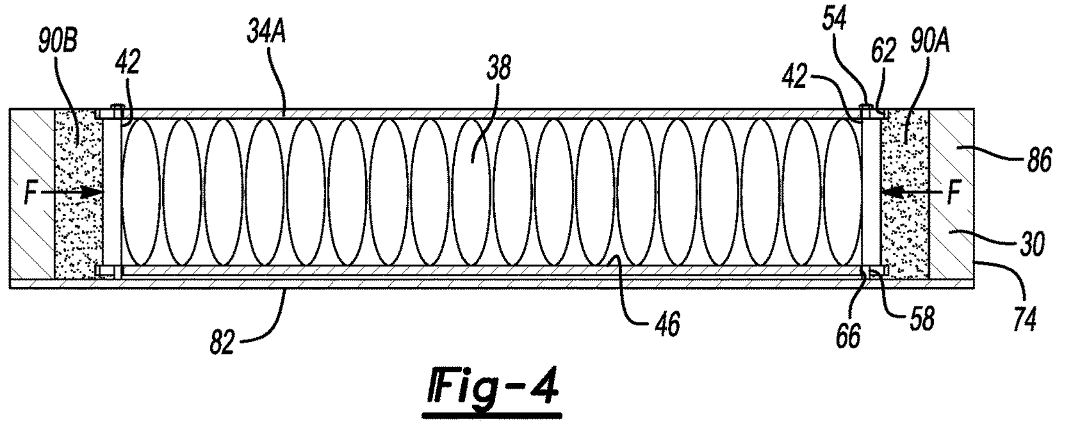
FIG. 4 illustrates the section view of FIG. 3 shortly after the battery array has been installed within the enclosure.
Figure 5:
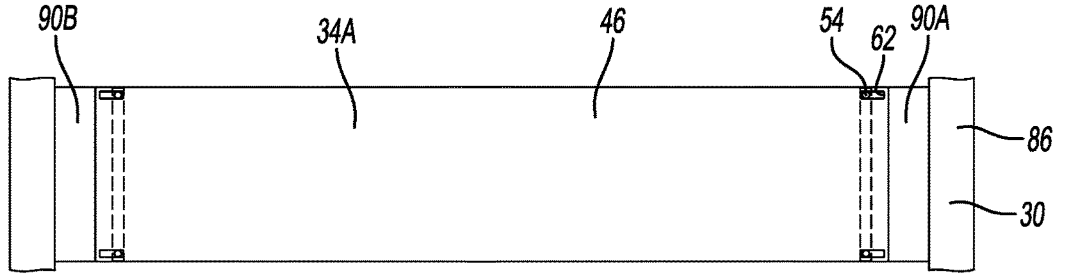
FIG. 5 illustrates a top view of the battery array of FIG. 4.

During installation, the battery array 34A is moved from the position of the FIGS. 2 and 3 to the position of FIGS. 4 and 5. When the battery array 34A is installed, the example first compressible member 90A is compressed a bit and is sandwiched between one of the endplates 42 of the battery array 34A and the enclosure sidewall 86. When the battery array 34A is installed, the compressible member 90B is sandwiched between the other of the endplates 42 and another of the enclosure sidewalls 86.

When the battery array 34A is installed, the first and second compressible members 90A, 90B directly contact the corresponding endplate 42. The first and second compressible members 90A, 90B apply forces F to the endplates 42.

When the battery array 34A is installed, the tension member on the bottom of the battery array 34A can be secured directly to the floor 82 using, for example, mechanical fasteners.

Figure 6:
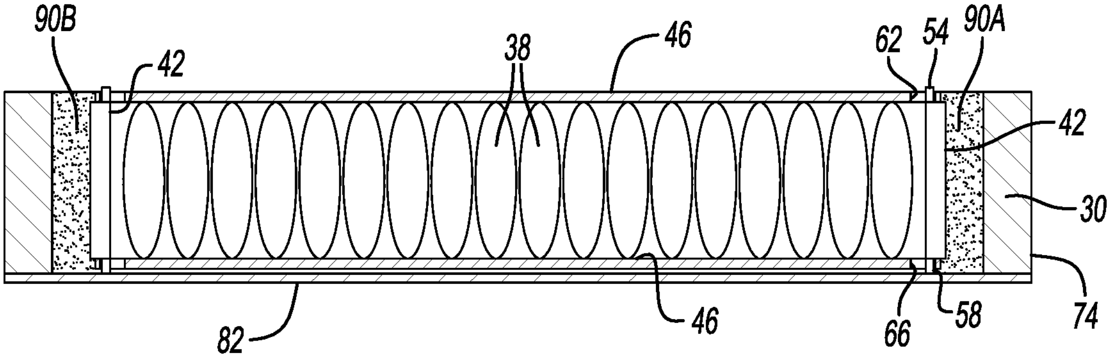
FIG. 6 illustrates the section view of FIG. 3 after battery cells of the array have expanded from the position of the FIG. 4.
Figure 7:
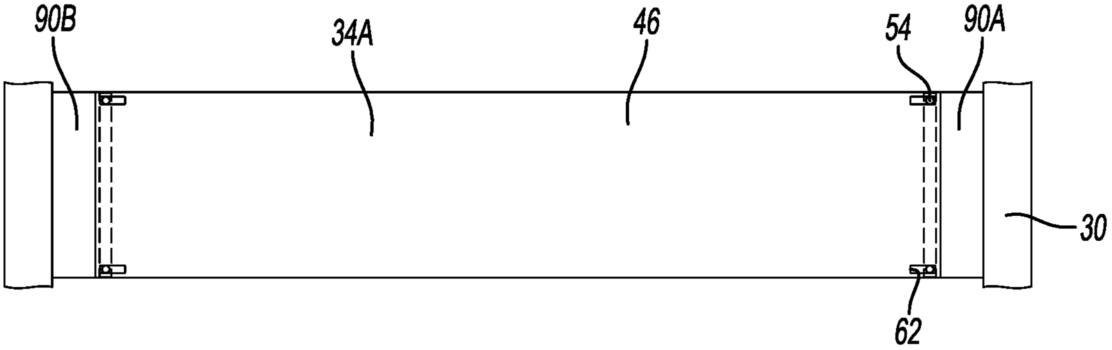
FIG. 7 illustrates a top view of the array of FIG. 6.

As the battery pack 14 is used, the battery cells 38 can expand. The tension members 46 can remain stationary as the battery cells 38 expand. As shown in FIGS. 6 and 7, sufficient expansion presses against the endplates 42, which slides the endplates 42 outward and compresses the first and second compressible members 90A, 90B. The additional area provided by the compressing permits the battery cells 38 to expand while maintaining a desired force on the battery cells 38.

The first and second compressible members 90A, 90B can be foam. In other examples, the compressible members 90A, 90B could be honeycomb-type structures made of a polymer-based material, for example. The compressible members 90A, 90B could also be a spring or even a deflection of pack support rail. The material composition and other aspects of the compressible members 90A. 90B can be adjusted to provide a desired response. For example, a relatively hard foam can be used if less movement of the endplates 42, and more pressure on the battery cells 38, is desired.

The example embodiments described above include a first compressible member and a second compressible member associated with each battery array. In another example, a single compressible member could be associated with each battery array. A single compressible member could be associated with an endplate at one end of the battery array, for example, while the second endplate of that battery array is fixed to the floor of the enclosure. As the battery cells of that battery array expand, the first endplate moves outward and compresses the single compressible member while the second endplate remains fixed to the floor.

Features of the disclosed examples include providing a desired force on battery cells over a usable life of the battery cells. A desired force can reduce a likelihood of lithium plating, seal ruptures, delamination, etc. The disclosed examples can rely on areas of the enclosure (e.g., enclosure sidewalls) to help apply the desired force. The structures of the example battery arrays can hold together the battery cells during shipping, handling, and installation. The examples utilize relatively few structural elements, which can simplify the design and potentially enhance recyclability options.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack assembly, comprising:
a plurality of battery cells;
a first endplate adjacent a first end of the plurality of battery cells;
a second endplate adjacent an opposite, second end of the plurality of battery cells;
a tension member, the first and second endplates each slidably coupled to the tension member; and
a compressible member disposed between the first endplate and a section of an enclosure, the compressible member configured to compress in response to the plurality of battery cells expanding and moving the first endplate toward the section of the enclosure.

2. The assembly of claim 1, wherein the compressible member is a first compressible member and the section of the enclosure is a first section of the enclosure, and further comprising a second compressible member disposed between the second endplate and second section of the enclosure, the second compressible member configured to compress in response to the plurality of battery cells expanding and moving the second endplate toward the second section of the enclosure.

3. The assembly of claim 1, further comprising one or more pins on one of the first endplate or the tension member, each pin of the one or more pins received within an aperture in the other of the first endplate or the tension member to slidably couple the first endplate to the tension member.

4. The assembly of claim 3, wherein the one or more pins includes two pins extending from a common side of the first endplate, each of the two pins received within a respective aperture in the tension member.

5. The assembly of claim 1, wherein the tension member is a first tension member disposed along a first side of the plurality of battery cells, and further comprising a second tension member disposed along an opposite, second side of the plurality of battery cells, the first and second endplates each slidably coupled to the second tension member.

6. The assembly of claim 5, wherein the first side of the plurality of battery cells faces vertically upward and the second side faces vertically downward.

7. The assembly of claim 5, wherein the first and second tension members each include at least one aperture that receive an endplate pin to slidably couple the first and second endplates to the first and second tension members.

8. The assembly of claim 5, wherein the first endplate, the second endplate, the first tension member, and the second tension member are configured to hold together the plurality of battery cells prior to installing the plurality of battery cells in a battery pack enclosure.

9. The assembly of claim 1, wherein the section of the enclosure is a sidewall of a tray of the enclosure.

10. The assembly of claim 9, wherein the compressible member is secured directly to the sidewall and directly contacts the first endplate.

11. The assembly of claim 1, wherein the compressible member is foam.

12. The assembly of claim 1, wherein the plurality of battery cells are pouch-style battery cells.

13. A battery cell retention method, comprising:
holding a plurality of battery cells between a first endplate and a second endplate that are slidably coupled to a tension member;

within a battery pack enclosure, sliding the first endplate relative to the tension member and the second endplate to accommodate expansion of the plurality of battery cells; and during the sliding, compressing a compressible member between the first endplate and the battery pack enclosure.

14. The battery cell retention method of claim 13, wherein the compressible member is a first compressible member and further comprising, sliding the second endplate relative to the tension member and the first endplate to accommodate expansion of the plurality of battery cells, and, when sliding the second endplate, compressing a second compressible member between the second endplate and the battery pack enclosure.

15. The battery cell retention method of claim 14, wherein the first and second endplates are slidably coupled to the tension member using a plurality of pins that are each received within a respective aperture.

16. The battery cell retention method of claim 14, wherein the tension member is a first tension member on a first side of the plurality of battery cells, wherein the first and second endplates are slidably coupled to the first tension member and a second tension member on an opposite second side of the plurality of battery cells.

17. The battery cell retention method of claim 13, wherein the compressible member is compressed, during the sliding, between the first endplate and a sidewall of the enclosure.

18. The battery cell retention method of claim 17, wherein the compressible member is secured directly to the sidewall and directly contacts the first endplate.

19. The battery cell retention method of claim 13, wherein the compressible member directly contacts the first endplate and the enclosure.

20. A battery pack assembly, comprising:

a plurality of battery cells;

a tension member;

a first endplate adjacent a first end of the plurality of battery cells, the first endplate including one or more first pins, each of the one or more first pins received within a respective aperture in the tension member;

a second endplate adjacent an opposite, second end of the plurality of battery cells, the second endplate including one or more second pins, each of the one or more second pins received within a respective aperture in the tension member;

a first compressible member disposed between the first endplate and a first section of an enclosure; and a second compressible member disposed between the first endplate and a second section of the enclosure, the first and second compressible members configured to compress in response to the plurality of battery cells expanding and moving the first endplate, the second endplate, or both.

* * * * *